United States Patent Office 3,529,975
Patented Sept. 22, 1970

3,529,975
PROCESS FOR PREPARING DRY FLAVORING MATERIAL FROM MOLLUSKS
Robert D. Gray, Gloucester, Mass., assignor to Gray Chemical, Inc., Gloucester, Mass., a corporation of Massachusetts
No Drawing. Continuation-in-part of application Ser. No. 480,475, Aug. 17, 1965. This application Aug. 7, 1969, Ser. No. 848,326
Int. Cl. A23l 1/22; A23b 3/04
U.S. Cl. 99—140          5 Claims

ABSTRACT OF THE DISCLOSURE

Process for manufacture of dry food products storable without refrigeration, and adapted for human consumption, comprising the steps of cooking an edible mollusk, separating the flesh portions only, and wet milling said separated edible flesh portions to produce a homogeneous uniform slurry and drying said slurry to produce a finely divided chemically and flavor stable material, and dry, edible products produced thereby.

---

This application is a continuation-in-part of copending application Ser. No. 480,475 filed Aug. 17, 1965, entitled "Food Products," now abandoned.

This invention relates generally to food products and food flavorings adapted for human consumption and has particular reference to a food flavoring material prepared from the flesh of mollusks and to a method of manufacture thereof from the flesh portions of edible mollusks.

It is highly desirable to provide storage stable flavoring materials for food products of various types which will impart thereto a flavor of the edible mollusks, for example, the flavor of mollusks such as mussels, scallops, clams, and oysters or mixtures of these. Such flavoring materials should be capable of prolonged storage without refrigeration and also without deterioration or loss of flavor or flavoring power. Preferably a relatively low amount of moisture is present in such food materials. In the past, attempts have been made to provide stable materials having flavors of the mollusks, but none of these has previously been commercially successful either because of excessive production costs, unsuitable or indifferent storage qualities, or failure to impart a satisfactory flavor to human food products, or some combination of these undesirable characteristics.

An object of this invention is to provide flavoring materials adapted for use as food products for human consumption and for use as flavoring materials for imparting the flavors of the mollusks, which flavoring materials are at the same time, economical to manufacture and capable of being stored satisfactorily for long periods of time without either spoilage or loss of flavor.

A further object of this invention is to provide a method or manufacturing flavoring materials of the type described which utilizes the flesh of one or more of the various mollusks, including those which are normally utilized for human consumption as well as certain ones which normally are not so utilized.

Another object of the invention is commercial utilization of edible mollusks such as mussels, clams, scallops, and oysters to give a storage stable flavoring material for human consumption where and when the fresh mollusks may not be available for use.

Other objects of the invention will be apparent to one skilled in the art from the following more detailed description of the invention.

Commercial handling and preparation of edible mollusks such as mussels, clams, scallops, oysters, and the like, including mixtures of same for food products, includes cooking the mollusks in boiling water, steam, or hot air either before or after the edible meat portions are separated from the shell. The edible portions are used for canning, freezing, or other utilization in appropriate food products. The shells are discarded and have no commercial value.

It has now been discovered that these same edible flesh portions after cooking can be utilized to provide dry, storable, food flavoring materials by a suitable selected series of processing steps. This food flavoring material has been found to be entirely satisfactory for human consumption as indicated by storage characteristics, stability, flavor and bacterial count both immediately ater preparation and following storage periods.

Certain types of mollusks while having edible flesh portions and readily available at or near the sea are not currently commercially utilized because of their lack of consumer appeal. Mussels and ocean quohaugs are two examples of such mollusks. While they have a desirable flavor, their size, texture, color and the like lack consumer appeal. However, by the process of this invention, the desirable flavor of such mollusks can be obtained and utilized without the disadvantages of undesirable characteristics.

The process briefly includes the steps of cooking the edible flesh portion only either prior to or after its removal from the shell. The cooked edible flesh sections of the mollusks which are the final raw material for the food flavoring are then preferably wet ground. This grinding step can be carried out using any conventional apparatus for comminuting of said materials. Two or more mills may be used, one for pregrinding and one for fine grinding as described. The particle size of the suspended flesh solids in the slurry formed by this grinding operation should be fine enough to allow subsequent rapid water evaporation by whatever drying method is used to give a fine free flowing powder after drying which may or may not contain small amounts of water.

The concentration of the slurry formed in the grinding step for the flesh portions is not unduly critical but is at least 5% solids and preferably higher to minimize as much as possible the extent of water evaporation required in the subsequent drying step.

The slurry at this point may if desired be treated with conventional flavor stabilizers as for example: certain starch compounds to encapsulate the flavor material and to enhance the flow properties, although such addition is not necessary. This assures retention of the flavor if the slurry is not immediately subjected to drying and processing. No other additives are necessary to give the final, dried products.

The slurry of ground edible flesh is dried in any conventional manner to produce the flavoring materials of the invention. Spray drying is preferred because of the speed, ease and lack of detrimental effect on the flavor, although other forms of drying can be used. For spray drying, the slurry particle size is preferably in the range 10–100μ. The desired food flavoring material is obtained directly from the drying step.

While the aforementioned series of steps constitutes the preferred process for production of the mollusk food flavors which are the subject of this invention, other embodiments of the invention may be used.

The drying step may be carried out by the application of heat, vacuum or both. It is continued until the wet slurry feedstock is reduced to at least below 5% moisture. It has been found most convenient to dry under reduced pressure allowing free passage of hot air preferably at a temperature of between 180° F. and 212° F. Great care must be taken during the drying operation to prevent decomposition of the material during drying. Decomposition in this step may variously result in purification or in reduction in flavoring and/or storage qualities of the product.

Regardless of the exact steps or process used to produce the food flavoring powder, it may be packaged in any suitable and well-known manner, such as in ordinary screw cap jars, for home use, or in polyethylene bags for bulk shipment to commercial food processors. No unusual precautions need be taken in packaging, since the food powders so prepared are not hydroscopic, and do not deteriorate in flavoring power or increase in bacteria count, even during long periods of unrefrigerated storage. Bacteria counts for food derived from seafood are generally required to have a plate count of less than 50,000. A batch of food flavoring powder manufactured by the latter described method, after a period of unrefrigerated storage, was found to have a plate count of under 5,000, a most surprising and unexpected characteristic of the material and a great advantage for such a product.

The flavoring materials disclosed herein may be utilized in the manufacture and preparation of many types of food products for human consumption such as dips, sauces, soups, crackers, and the like. For many products, addition of the powder in the proportion of about .1% by weight imparts a suitable flavor thereto. The flavor may be enhanced if desired by the addition of a flavor intensifier such as mono-sodium glutamate, and for special flavors, powders prepared from mixtures of different types of mollusks by the process hereof may be mixed.

Processing of mollusks are not equivalent to that of crustaceans. It is necessary to neutralize and stabilize crustacean shell and fibrous material with acid (for example citric acid). Crustacean products not so treated have a short shelf life (less than one week) flavor, whereas mollusks have an indefinite shelf life without requiring such treament. The natural enzymes present in the mollusk are sufficient to break down and stabilize the final flavor compound.

EXAMPLE 1

For commercial preparation of the common clam strips used for fried clams only 40–50% of the clam flesh is used. About 100 lbs. of clam waste (flesh) from a commercial process were cooked in boiling water. The cooked, edible flesh portions of the clams milled in a whirling blade commutator to yield milled flesh having a particle size below 1/8" average diameter. This milled material was then fed to another mill and further ground to give a particle size in the range 5–100μ. The slurry obtained was about 10–15% by weight solids. This slurry was then spray dried giving a product having about 5% moisture and a low bacterial count. The product was stable for long storage times without refrigeration and its flavor did not change. It was found to impart a very excellent flavor to sauces and cheesedip and was entirely fit and well adapted to human consumption.

EXAMPLE 2

About 80 lbs. of previously shelled and frozen sea clams consisting solely of the flesh of the clams, were cooked at 240° F. for 2½ hours. Approximately 47 lbs. of clams (flesh) and 30 lbs. of broth were obtained. The flesh of the clams and broth were then milled together in the commutator through a 1/8" screen ½ lb. of starch was then added to the slurry and it was milled 3 passes through a colloid mill. 20 gallons of slurry were obtained. The slurry was spray dried and gave a very fine, free-flowing powder entirely fit and suitable for human consumption and capable of storage without refrigeration. The bacteria count was 4000 and the coliform was L–10. This dry powder was found to impart a very excellent clam flavor to sauces and dips.

EXAMPLE 3

1000 lbs. of liquid waste was obtained from a commercial processor, which is the water slurry and steam condensate remaining after cooking the clams (flesh). This waste water was heated to 160° F. for 1 hour. The resulting slurry was spray dried resulting in 100 lbs. of finely divided powder. The resulting clam flavor was excellent having a plate count of 500.

EXAMPLE 4

About 100 lbs. of oysters were shelled, the shells discarded and the flesh cooked. The edible flesh of the oysters were then wet milled diluting the solids content during the process to 15% by weight to a particle size of 100μ. The resulting spray dried product was found to be stable on storage and imparted a very excellent oyster flavor to sauces and dips.

Since certain obvious changes may be made in the herein described embodiments of the invention, it is intended that all matter contained herein be interpreted in an illustrative and not in a limiting sense.

What is claimed is:

1. A process for conversion of mollusks into food flavoring materials consisting solely of the flesh of said mollusks and suitable for human consumption which consists of the steps of cooking mollusks, wet milling at least a portion of separated flesh portion only excluding shells to yield at least a 5% solids slurry of particles in the size of about 10 to 100μ and spray drying the resulting flesh slurry with hot air at a temperature of 180° to 212° F. to reduce the moisture content to at least below 5%, to yield dry, particulate, storable, edible food materials.

2. The process of claim 1 wherein the mollusk employed is the clam.

3. The process of claim 1 wherein the mollusk is the oyster.

4. The process of claim 1 wherein the mollusk employed is the mussel.

5. The particulate food flavoring material prepared in accordance with the process described in claim 1.

References Cited

UNITED STATES PATENTS

| 1,001,375 | 8/1911 | Edwards | 99—209 |
| 3,256,098 | 6/1966 | Ohtaki | 99—111 X |
| 3,264,116 | 8/1966 | Gray | 99—209 X |

HYMAN LORD, Primary Examiner

U.S. Cl. X.R.

99—209